United States Patent

Burner et al.

[11] Patent Number: 5,855,319
[45] Date of Patent: Jan. 5, 1999

[54] VEHICLE HEATER

[75] Inventors: Erwin Burner, Adelberg; Michael Humburg, Göppingen; Fritz Mohring, Ostfildern; Peter Reiser; Harald Sailer, both of Esslingen; Edwin Steiert, Wolfschlugen; Heinrich Wacker, Weilheim, all of Germany

[73] Assignee: J. Eberspächer GmbH & Co., Esslingen, Germany

[21] Appl. No.: 793,835

[22] PCT Filed: Jan. 9, 1996

[86] PCT No.: PCT/DE96/00044

§ 371 Date: Feb. 19, 1997

§ 102(e) Date: Feb. 19, 1997

[87] PCT Pub. No.: WO96/23179

PCT Pub. Date: Aug. 1, 1996

[30] Foreign Application Priority Data

Jan. 24, 1995 [DE] Germany ............ 195 02 082.0

[51] Int. Cl.[6] ........................................ B60H 1/02
[52] U.S. Cl. ............................ 237/12.3; 237/12.3 C
[58] Field of Search ............ 237/12.3 B, 12.3 C; D23/324, 328

[56] References Cited

U.S. PATENT DOCUMENTS

| | | | |
|---|---|---|---|
| D. 75,701 | 9/1928 | Spillman | D23/324 |
| 3,861,590 | 1/1975 | Kofink | 237/12.3 C |
| 4,010,895 | 3/1977 | Kofink et al. | 237/12.3 C |
| 4,718,602 | 1/1988 | Beck et al. | 237/32 |
| 5,253,806 | 10/1993 | Gaysert et al. | 237/12.3 C |
| 5,299,554 | 4/1994 | Mohring | 126/110 D |
| 5,408,960 | 4/1995 | Woytowich | 183/142.5 E |
| 5,413,279 | 5/1995 | Quaas et al. | 237/12.3 C |

*Primary Examiner*—Henry A. Bennett
*Assistant Examiner*—Derek S. Boles
*Attorney, Agent, or Firm*—McGlew and Tuttle

[57] ABSTRACT

A vehicle heater with a burner, a fan for the combustion air to be fed to the burner, a heat exchanger for heating the engines's cooling water, which is circulated in a closed circuit, and with a control device. A basic housing is provided substantially in the form of one of a parallelepiped and a semicylinder with an essentially flat, continuous upper housing surface. The basic housing is axially divided into a first housing end section, which is located at a first end and accommodates the burner and the heat exchanger, a middle housing part containing the fan, as well as a second housing end section comprising the control device. The inlet and outlet connections of the heat exchanger as well as a connecting branch for fuel to be fed to the burner are located within the upper surface of the basic housing. An attachment-type housing with at least one circulating pump for the cooling water to be heated can be attached essentially to the entire upper housing surface of the basic housing to form one of an approximately parallelepipedic or cylindrical overall housing. Also a cover can be attached essentially to the entire upper housing surface of the basic housing if the attachment-type housing is not employed.

17 Claims, 2 Drawing Sheets

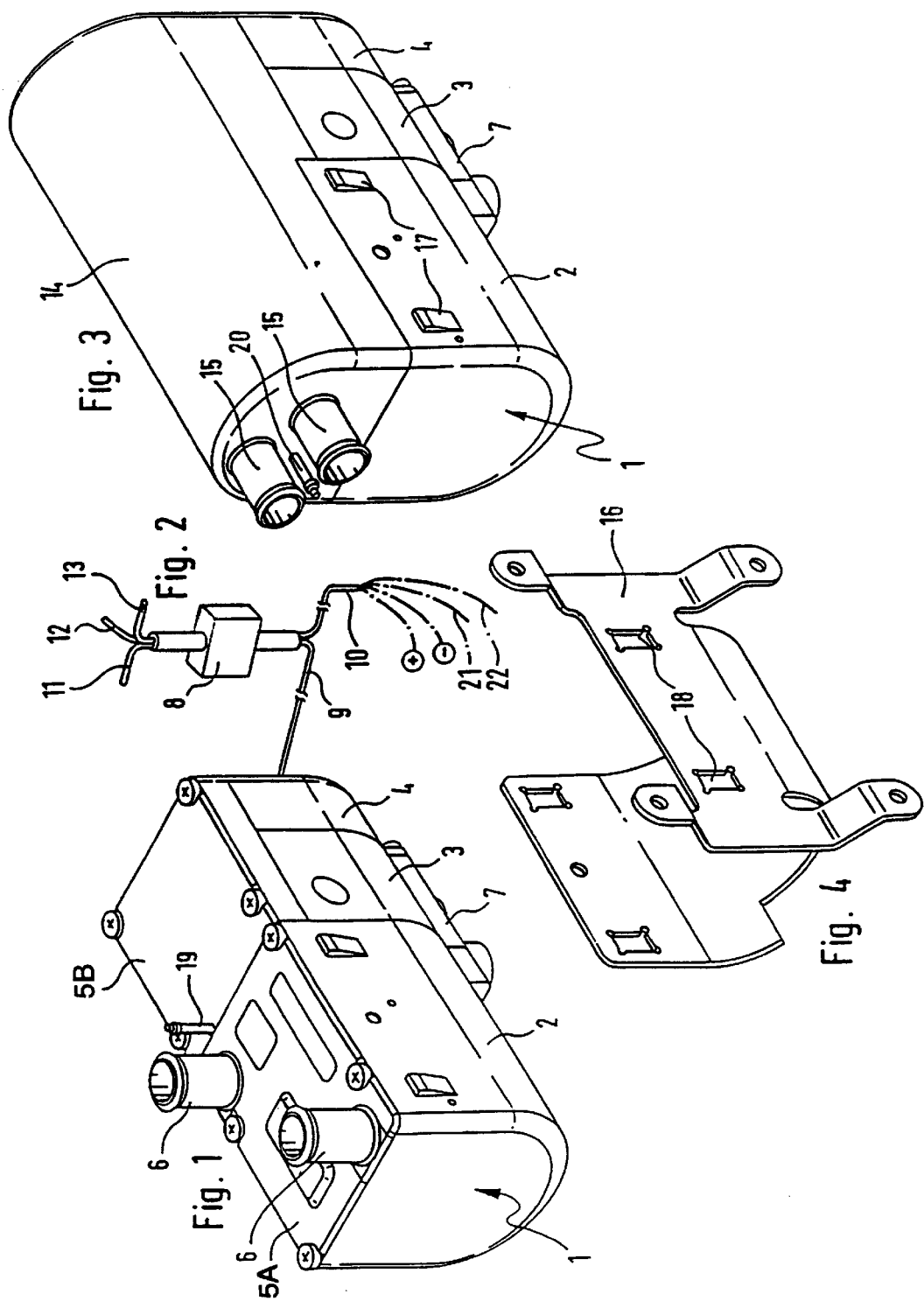

VEHICLE HEATER

FIELD OF THE INVENTION

The present invention pertains to a vehicle heater with a burner, with a fan for the combustion air to be fed to the burner, with a heat exchanger for heating the engines's cooling water, which is circulated in a closed circuit, and with a control device.

BACKGROUND OF THE INVENTION

Vehicle heaters may be designed as auxiliary or parking heaters. Auxiliary heaters require a running vehicle engine for their operation. In contrast, parking heaters are designed, in general, for an engine-independent operation. In addition, parking heaters may, of course, also be operated in an auxiliary function in addition to their parking heater function.

Some modern vehicle engines have such a high efficiency that in cool weather, they are not always able to make available a sufficient amount of waste heat for heating the interior space of the vehicle. This problem arises, e.g., especially in the case of direct-injection diesel engines with low fuel consumption. In cases of engine waste heat which is too low for the sufficient heating of the interior space of the vehicle, the engines or vehicles are provided with auxiliary heaters. These auxiliary heaters are usually burner-operated and heat the cooling water of the engine, which is used for heating the vehicle via a heat exchanger present in the auxiliary heater. The heat exchanger is an integrated part of the cooling water line or at least of a partial cooling water circuit supplying the vehicle heater. If the cooling water temperature is too low for sufficiently heating the interior space of the vehicle, the burner of the auxiliary heater can be switched on automatically when the engine is running in order to sufficiently heat the cooling water. A control device ensures that the auxiliary heater operates only when the cooling water temperature is too low in relation to the outside temperature and a desired heat demand for heating the interior space of the vehicle. In contrast, the auxiliary heater remains inactive in all other cases. For reasons of efficiency and costs, such auxiliary heaters are provided only with the functional parts that are absolutely necessary for their function as auxiliary heaters. Therefore, these devices have, in particular, no cooling water-circulating pump of their own, i.e., the cooling water circulation is generated exclusively by the cooling water-circulating pump of the vehicle engine. The cooling water pump of the engine, which must be present for cooling the engine with cooling water, on the one hand, and for supplying the engine-dependent, usual vehicle heater, on the other hand, even without an additional vehicle heater, is mechanically driven by the engine at least during the drive mode of the engine. An electric circulating pump is also additionally provided in some cases in order to ensure a large throughput corresponding to the cooling demand of the engine and to the heat demand of the heater even during the idling of the engine, in particular, when its speed is sometimes too low for a sufficient capacity of the pump.

SUMMARY AND OBJECTS OF THE INVENTION

In light of the fact that buyers or owners of vehicles which must be equipped with auxiliary heaters for a sufficient heat supply for the interior space of the vehicle sometimes wish to also have a more comfortable parking heater for their vehicles, which also operates independently from the engine, the present invention pertains to the object of designing an auxiliary heater such that the largest possible number of its parts can be used unchanged for manufacturing a parking heater. The overall dimensions of a parking heater, which is made by using the largest possible number of parts of an auxiliary heater, shall differ from the corresponding dimensions of the auxiliary heater as little as possible. In particular, the fastening elements with which an auxiliary heater or a parking heater is fastened to the engine or to a part of the vehicle shall have an identical design.

In addition, an auxiliary heater, which is already installed in a vehicle, shall be able to be upgraded to a heater that can be operated in an engine-independent manner and has the largest possible number of functions of a usual parking heater with the simplest possible means, without changing its basic design.

One fundamental solution to the above-described set of problems comprises designing a vehicle heater for a function as an auxiliary heater. The heater has a burner, with a fan for the combustion air to be fed to the burner, with a heat exchanger for heating the engines's cooling water, which is circulated in a closed circuit, and with a control device. The vehicle heater is arranged within a basic housing approximately in the form of a parallelepiped or a semicylinder with an essentially flat, continuous upper housing surface. The vehicle heater is axially divided into a first housing end section, which is located at a first end and accommodates the burner and the heat exchanger, a the middle housing part containing the fan, as well as a second housing end section comprising the control device. The inlet and outlet connections (branches) of the heat exchanger as well as a connecting branch for fuel to be fed to the burner are located within the upper surface of the basic housing.

Such a heater can have an extraordinarily compact design. Due to a division into three housing parts, it is possible to embody heaters with different designs and functions with constant shape of the basic housing by using a large percentage of parts of an identical design. This guarantees the inexpensive manufacture of different types of heaters. The arrangement of the inlet and outlet openings for the combustion air in the lower surface of the basic housing ensures a space-saving installation of the vehicle heater according to the present invention.

In an embodiment according to the invention, the vehicle heater has only the function of an auxiliary heater. A cover closes the upper surface of the basic housing. If an upgrading to a heater with a broader parking heater function is desired, such a function can be achieved in the simplest form simply by connecting an auxiliary control device to the control device of the basic housing of the auxiliary heater. The vehicle fan, which is crucial for the heating of the interior space, an electric cooling water pump, as well as a fuel pump for supplying the burner of the auxiliary heater with fuel, are then activated with this auxiliary control device. This type of upgrading makes it necessary to accept the fact in the case of the parking heater function that an additional cooling water-circulating pump that can be operated electrically must be additionally installed in the cooling water-circulating pipe in those cases in which an engine has only a cooling water-circulating pump driven mechanically by the engine and no additional cooling water-circulating pump that can be operated electrically. Even though this can be done with relative ease by severing the cooling water pipe at any desired point and inserting a circulating pump at that point, a vehicle heater thus upgraded already represents a parking heater operating in an engine-independent manner.

Auxiliary heaters usually operate with a fuel-delivering and metering means of their own for the fuel to be fed to the burner. This means is usually arranged as a whole outside the auxiliary heater housing in the fuel line leading from the tank to the burner. However, it may also be arranged completely or partially in the auxiliary heater housing. It is also conceivable that no separate delivery means is used to supply the burner with fuel, but the burner fuel is allowed to be delivered by the engine's fuel pump in bypass, and only a metering valve is provided at or in the auxiliary heater. If no separate water pump were provided for the auxiliary heater, it would be possible to manufacture the auxiliary heater with a minimum number of functional parts in the case of this variant.

If an auxiliary heater already operates with an independent metering and delivery means for the burner fuel, no additional expense is incurred in the case of an upgrading to a parking heater. If, in contrast, the burner fuel is delivered by the engine's fuel pump in bypass in the case of an auxiliary heater, it is also necessary to additionally install an engine-independent fuel metering and/or delivery means for the burner fuel in the case of an upgrading to a parking heater.

A parking heater operating in an engine-independent manner must be able to be switched on by the driver of the correspondingly equipped vehicle directly or in a preprogrammed manner, according to the data supplied by the operator. An operating part, which may be an automatic timer or a radio control means, is needed for this. The receiver of a radio control means may be advantageously directly integrated in the auxiliary control device.

The auxiliary control device can be retrofitted on a vehicle already equipped with an auxiliary heater very simply by severing the electrical cable connection between the control device of the basic vehicle heater and the electric cable harness of the vehicle and inserting the auxiliary control device into the cable line at its severed point.

If a complete parking heater, especially with a separate cooling water pump and fuel-metering means is desired for the vehicle from the very beginning, the basic housing can be complemented into such a parking heater by simply attaching an attachment-type housing with the necessary auxiliary means. An approximately parallelepipedic or cylindrical overall housing is obtained in this case, which is suitable, based on its dimensions, for being mounted at the same point of the engine or vehicle at which the basic housing would otherwise be placed if only an auxiliary heating function were desired. The upper cover of the basic housing is preferably eliminated in a parking heater, which comprises the basic housing of an auxiliary heater and an attachment-type housing placed on it. The function of this cover is directly assumed by the attachment-type housing in this case. The cooling water connections in the attachment-type housing are aligned in reference to a connection to the heat exchanger of the basic housing such that they are aligned with the connections of the basic housing. This also applies to the fuel-metering means if such a metering means is also installed in the attachment-type housing. This leads to a simple and compact connection between the cooling water connections of the heat exchanger and of the fuel connecting branch on one side and the associated parts of the attachment-type housing on the other side.

The cooling water and fuel connecting branches of the attachment-type housing are preferably arranged especially together in the front wall of the attachment-type housing which is associated with the first housing end section.

The vehicle heater according to the present invention is fastened to the engine or the vehicle only via the first housing end section of the basic housing. A plurality of locking means, with which the housing part can be removably snapped into a clasp, which can be fastened to the engine or the housing and has corresponding counterlocking means, are provided there, at the first housing end section, for this purpose at the longitudinally directed, opposite outer surfaces. The locking connection is preferably designed such that cams, which can be snapped into openings of the mounting clasp, are arranged on the housing end section of the basic housing. To release the basic housing from the clasp, the latter is to be opened up briefly for removal. The clasp itself consists for this purpose of an elastic material, which may be, e.g., a sheet material. The clasp as a mounting device for the vehicle heater can be used in unchanged form for mounting only the basic housing or the basic housing including the attachment-type housing.

The control device contained in an end area of the basic housing may be equipped differently depending on the necessary demand, depending on whether it shall assume the function of an auxiliary heater only or of a complete parking heater.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a vehicle heater designed as an auxiliary heater,

FIG. 2 is an auxiliary control device for upgrading an auxiliary heater according to FIG. 1 to a heater having the function of a parking heater, FIG. 3 is a parking heater comprising a basic housing forming the auxiliary heater and an integrally attached attachment-type housing, and FIG. 4 is a fastening clasp for a vehicle heater in the embodiments according to FIG. 1 or 3;

DESCRIPTION OF THE PREFERRED EMBODIMENTS

Figure 5:
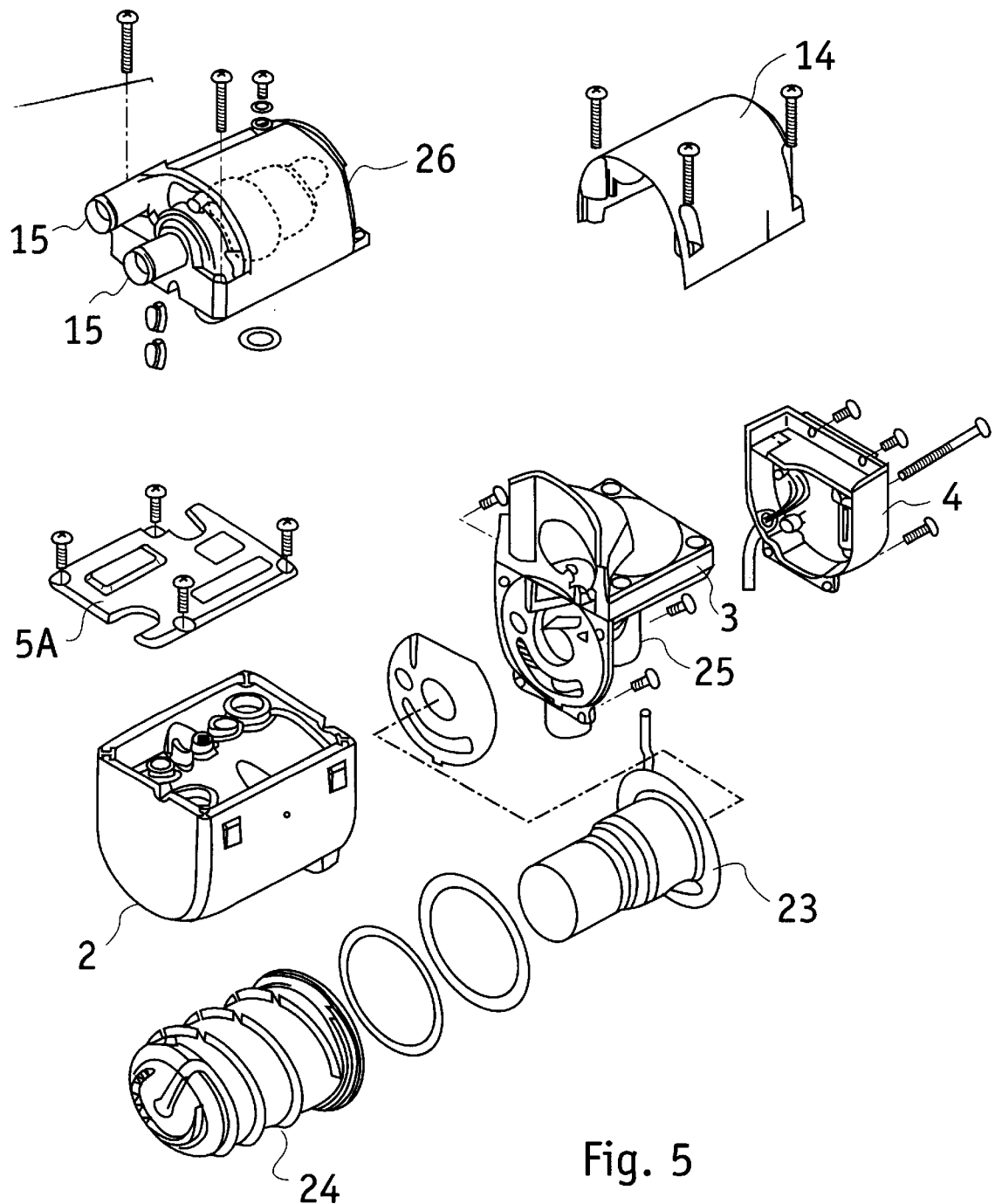
FIG. 5 is an exploded view of the embodiment according to FIGS. 1 to 3.

The auxiliary heater shown in FIG. 1 is accommodated in a so-called basic housing 1. This basic housing 1 in the form of an, e.g., longitudinally divided cylinder with a flat upper surface, is composed of a total of three housing parts 2, 3, 4, which are located next to each other lengthwise. A burner 23 operated with fuel as well as a heat exchanger 24, in which a liquid heat carrier medium is heated, are located in a first housing section 2. This liquid heat carrier medium is usually the cooling water of the vehicle engine. The first housing section 2 is joined in the longitudinal direction by a middle housing part 3, which accommodates the fan 25 for the combustion air of the burner.

The second end of the basic housing 1 is formed by a second housing end section 4 for accommodating the means controlling the heater, i.e., the heater control device.

The upper closure of the basic housing 1 is formed by essentially flat, screwed-on covers 5. Pipe branches 6 for feeding in and removing the cooling water, which is heated in the heat exchanger of this section, extend through the cover 5 of the first housing end section 2. A connecting branch 19 for fuel to be fed to the burner also extends through the cover 5. The cooling water, to be passed through the heat exchanger of the heater, is circulated by a circulating pump located outside the heater. The circulating pump may be the usual cooling water pump that is usually driven mechanically by the engine.

The fuel for the burner may be delivered in a bypass by the engine's fuel pump during the operation of the engine. The metering valve, which is now needed for the auxiliary heater only, may also be installed in the latter case in the basic housing, especially in the middle part 3.

The combustion air inlet and outlet to and from the burner of the heater are located in the bottom area 7 of the basic housing 1.

The vehicle heater according to FIG. 1, which is initially designed for an auxiliary heating function only, can be upgraded to a parking heater function with the auxiliary control device 8. Parking heater function means here that a heater thus upgraded can be operated, in particular, in an engine-independent manner. This auxiliary control device 8 may be inserted via its electric connecting lines 9 into the electric line 10 between the heater and the electric cable harness of a vehicle. The auxiliary heater receives the vehicle start signal via the electric input 21. The line connection 21 is used to energize an external fuel delivery means for the burner of the auxiliary heater. An electric cooling water pump 26 is energized by the auxiliary control device 8 via an output 11, the electric vehicle fan is energized via the input 12, and the fuel delivery means for the burner fuel is energized via the input 21. The cooling water pump may be an electric circulating pump to be additionally inserted into the cooling water circuit or a pump which is already present in the cooling water circuit as an electrically drivable pump for the usual operation of the engine without auxiliary heating or parking heating function, in addition to the mechanically driven cooling water-circulating pump of the engine. The heater itself is integrated via its pipe branch 6 in the cooling water circuit of the vehicle or of the vehicle engine. The location of this pipe branch is independent from whether the heater operates only as an auxiliary heater or, due to the connection of the auxiliary control device 8, as a parking heater.

To operate the heater in an engine-independent manner, the auxiliary control device 8 has an input 13, to which, e.g., an automatic timer may be connected. A receiver for a radio control may also be connected via this input 13.

The auxiliary control device is able to distinguish a start signal (electric input 21) for the operation of the auxiliary heater, which start signal may possibly be present due to the operation of the vehicle or vehicle engine, from a parking heater start signal (input 13). As a result, a heater upgraded with the auxiliary control device according to the present invention may be activated primarily by the vehicle, i.e., in an engine-dependent manner, or in an engine-independent manner by a start signal generated arbitrarily externally.

Integrating the receiver for a radio control in the auxiliary control device represents an inexpensive possibility of operating the heater in an engine-independent manner.

The vehicle heater according to FIG. 1 is complemented in FIG. 3 into a complete, engine-independent parking heater by attaching an attachment-type housing 14. A separate circulating pump for a cooling water circuit or partial cooling water circuit, which is to be operated with the heater, is located in the attachment-type housing 14. The connecting branches on the cooling water circuit are arranged on the front side of the attachment-type housing 14 and are designated by 15. The fuel connecting branch 20 also leads out of the attachment-type housing 14 through this front side.

The attachment-type housing 14 is connected to the basic housing 1 without the insertion of the covers 5 of the basic housing 1. Besides the cooling water pump, a fuel-metering means for the burner of the heater is preferably also located in the attachment-type housing.

A clasp 16 consisting of a highly elastic material is used to fasten the vehicle heater, both in the embodiment according to FIG. 1 designed as an auxiliary heater and in the embodiment according to FIG. 3 designed as a complete parking heater, to the engine or the chassis of a vehicle. The clasp 16 is screwed on tightly at the corresponding mounting point of the engine or of the vehicle chassis. The different embodiments of the vehicle heater are mounted exclusively in the area of the first housing end section 2. A pair of locking cams 17 are provided in this area on the opposite longitudinal sides. The basic housing is pushed with these locking cams 17 into the clasp 16, which has corresponding holding openings 18 for receiving the locking cams. The basic housing 1 is inserted into the clasp 16 by the automatic locking in of the locking connection, which is correspondingly designed for this in the known manner. An intended separation of the connection is easily possible by opening up the clasp in a simple manner and without special tools.

While specific embodiments of the invention have been shown and described in detail to illustrate the application of the principles of the invention, it will be understood that the invention may be embodied otherwise without departing from such principles.

We claim:

1. A vehicle heater, comprising:
   a burner;
   a fan for the combustion air to be fed to the burner;
   a heat exchanger for heating the engines's cooling water, which is circulated in a closed circuit;
   a control device; and
   a basic housing substantially in the form of one of a parallelepiped and a semicylinder with an essentially flat, continuous upper housing surface, which is axially divided into a first housing end section, which is located at a first end and accommodates the burner and the heat exchanger, a middle housing part containing the fan, as well as a second housing end section comprising said control device, wherein inlet and outlet connections of said heat exchanger as well as a connecting branch for fuel to be fed to said burner are located within said upper surface of the basic housing, inlet and outlet openings for the combustion air in said basic housing are located at a lower surface of said basic housing, said first and second end section and said middle part are separateable from each other and interchangeable with other differently designed end sections and middle parts to create different types of heaters.

2. A vehicle heater in accordance with claim 1, wherein said auxiliary control device is provided with a means by which a start signal generated in an engine-dependent manner and a start signal generated in an engine-independent manner can be recognized and can be evaluated to switch on the vehicle heater to one of an auxiliary heater function and a parking heater function.

3. A vehicle heater in accordance with claim 1, further comprising a receiver for radio control of the heater integrated within said auxiliary control device.

4. A vehicle heater in accordance with claim 2, further comprising a receiver for radio control of the heater integrated within said auxiliary control device.

5. A vehicle heater in accordance with claim 4, further comprising a fuel-metering means for metering the fuel to be fed to the burner, said fuel-metering means being provided in said attachment-type housing.

6. A vehicle heater in accordance with claim 4, wherein said attachment-type housing is equipped with inlet and outlet branches for a cooling water-circulating pump as well as with a connection for the fuel-metering means of the heater burner, which are aligned with said inlet and outlet connections of the heat exchanger and with a fuel feed to said burner with said attachment-type housing attached to said basic housing.

7. A vehicle heater in accordance with claim 4 further comprising a basic housing cover, said attachment-type housing being directly connected to said basic housing, with said cover of said basic housing removed.

8. A vehicle heater in accordance with claim 6 further comprising a basic housing cover, said attachment-type housing being directly connected to said basic housing, with said cover of said basic housing removed.

9. A vehicle heater in accordance with claim 7, wherein said connecting branches of said cooling water pump and said fuel connecting branches are located in a front surface of the said attachment-type housing, said front surface being aligned with a front wall of said front housing end section.

10. A vehicle heater in accordance with claim 6 wherein said connecting branches of said cooling water pump and said fuel connecting branches are located in a front surface of the said attachment-type housing, said front surface being aligned with a front wall of said front housing end section.

11. A vehicle heater, comprising:
a burner;
a fan for the combustion air to be fed to the burner;
a heat exchanger for heating the engines's cooling water, which is circulated in a closed circuit;
a control device;
a basic housing substantially in the form of one of a parallelepiped and a semicylinder with an essentially flat, continuous upper housing surface, which is axially divided into a first housing end section, which is located at a first end and accommodates the burner and the heat exchanger, a middle housing part containing the fan, as well as a second housing end section comprising said control device, wherein inlet and outlet connections of said heat exchanger as well as a connecting branch for fuel to be fed to said burner are located within said upper surface of the basic housing; and
upper surface contact means including one of
an attachment-type housing with at least one circulating pump for the cooling water to be heated, said attachment-type housing being attached essentially to the entire upper housing surface of said basic housing to form one of an approximately parallelepipedic and cylindrical overall housing, and
a basic housing cover, said attachment-type housing being directly connected to said basic housing, with said cover of said basic housing not being connected to said basic housing.

12. A vehicle heater in accordance with claim 11, further comprising a fuel-metering means for metering the fuel to be fed to the burner, said fuel-metering means being provided in said attachment-type housing.

13. A vehicle heater in accordance with claim 11, wherein said attachment-type housing is equipped with inlet and outlet branches for a cooling water-circulating pump as well as with a connection for the fuel-metering means of the heater burner, which are aligned with said inlet and outlet connections of the heat exchanger and with a fuel feed to said burner with said attachment-type housing attached to said basic housing.

14. A vehicle heater, comprising:
a burner;
a fan for the combustion air to be fed to the burner;
a heat exchanger for heating the engines's cooling water, which is circulated in a closed circuit;
a control device;
a basic housing substantially in the form of one of a parallelepiped and a semicylinder with an essentially flat, continuous upper housing surface, which is axially divided into a first housing end section, which is located at a first end and accommodates the burner and the heat exchanger, a middle housing part containing the fan, as well as a second housing end section comprising said control device, wherein inlet and outlet connections of said heat exchanger as well as a connecting branch for fuel to be fed to said burner are located within said upper surface of the basic housing;
an auxiliary control device for activating at least one of a fan for a vehicle, a fuel-delivery fuel-metering means, and an electric water pump, said auxiliary control being connected to said control device in said second housing end section of said basic housing.

15. A vehicle heater, comprising:
a burner;
a fan for the combustion air to be fed to the burner;
a heat exchanger for heating the engines's cooling water, which is circulated in a closed circuit;
a control device;
a basic housing substantially in the form of one of a parallelepiped and a semicylinder with an essentially flat, continuous upper housing surface, which is axially divided into a first housing end section, which is located at a first end and accommodates the burner and the heat exchanger, a middle housing part containing the fan, as well as a second housing end section comprising said control device, wherein inlet and outlet connections of said heat exchanger as well as a connecting branch for fuel to be fed to said burner are located within said upper surface of the basic housing, said upper housing surface of said basic housing being formed by at least one removable cover.

16. A vehicle heater, comprising:
a burner;
a fan for the combustion air to be fed to the burner;
a heat exchanger for heating the engines's cooling water, which is circulated in a closed circuit;
a control device; and
a basic housing substantially in the form of one of a parallelepiped and a semicylinder with an essentially flat, continuous upper housing surface, which is axially divided into a first housing end section, which is located at a first end and accommodates the burner and the heat exchanger, a middle housing part containing the fan, as well as a second housing end section comprising said control device, wherein inlet and outlet connections of said heat exchanger as well as a connecting branch for fuel to be fed to said burner are located within said upper surface of the basic housing;
an attachment-type housing with at least one circulating pump for the cooling water to be heated, said attachment-type housing being attached essentially to the entire upper housing surface of said basic housing to form one of an approximately parallelepipedic and cylindrical overall housing.

17. A vehicle heater, comprising:

a burner;

a fan for the combustion air to be fed to the burner;

a heat exchanger for heating the engines's cooling water, which is circulated in a closed circuit;

a control device;

a basic housing substantially in the form of one of a parallelepiped and a semicylinder with an essentially flat, continuous upper housing surface, which is axially divided into a first housing end section, which is located at a first end and accommodates the burner and the heat exchanger, a middle housing part containing the fan, as well as a second housing end section comprising said control device, wherein inlet and outlet connections of said heat exchanger as well as a connecting branch for fuel to be fed to said burner are located within said upper surface of the basic housing;

a clasp and a detachable spring-loaded latch, said clasp holding said first housing end section of said basic housing locked in said clasp, said clasp being fastened to any desired part of a vehicle or engine, via a detachable spring-loaded latch, and the vehicle heater being inserted, aligned horizontally with its longitudinal axis, into a correspondingly aligned said clasp vertically from the top.

* * * * *